(No Model.)
J. H. BOWEN.
CIGAR CUTTER.
No. 467,731. Patented Jan. 26, 1892.
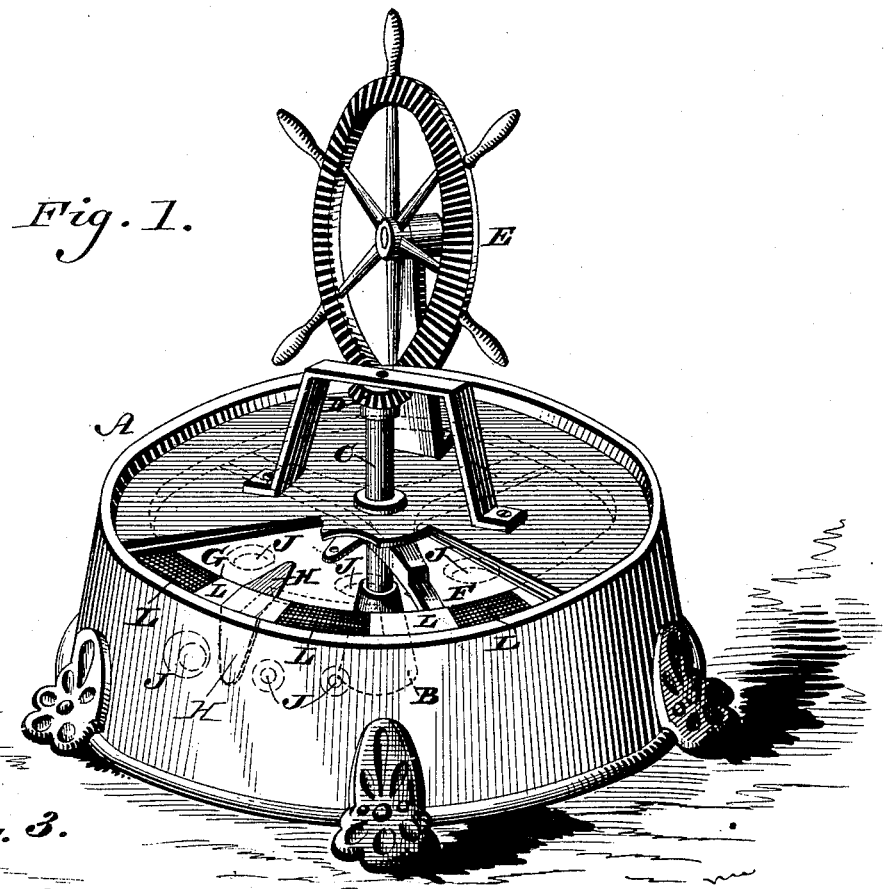
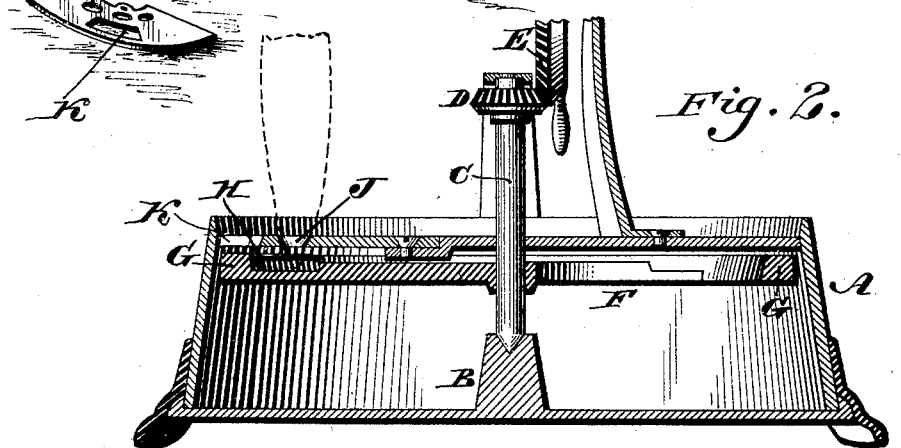
WITNESSES:
L. Douville,
Wm. C. Wiedersheim.
INVENTOR
James H. Bowen,
BY
John A. Wiedersheim.
ATTORNEY.

UNITED STATES PATENT OFFICE.

JAMES H. BOWEN, OF PHILADELPHIA, PENNSYLVANIA.

CIGAR-CUTTER.

SPECIFICATION forming part of Letters Patent No. 467,731, dated January 26, 1892.

Application filed July 24, 1890. Serial No. 359,729. (No model.)

*To all whom it may concern:*

Be it known that I, JAMES H. BOWEN, a citizen of the United States, residing in the city and county of Philadelphia, State of Pennsylvania, have invented a new and useful Improvement in Cigar-Cutters, which improvement is fully set forth in the following specification and accompanying drawings.

My invention consists of a cigar-cutter of novel construction, as will be hereinafter set forth, and pointed out in the claim.

Figure 1 represents a perspective view of a cigar-cutter embodying my invention. Fig. 2 represents a vertical section of a portion thereof. Fig. 3 represents a perspective view of a detached portion on a reduced scale.

Similar letters of reference indicate corresponding parts in the several figures.

Referring to the drawings, A designates a box or casing, which is provided with a step B, forming the bearings of a rotary shaft C, to which is keyed or otherwise secured the gear-wheel D, with which meshes the driving gear-wheel E, the latter being mounted on a standard rising from the top or other suitable portion of the casing.

Within the casing and secured to the shaft C is a wheel or ring F, to whose rim G is secured a knife H, which when the wheel is rotated moves closely to the under side of the top of the casing as a shear, said top having openings J to receive the tips of cigars, so that as the wheel is rotated the blade comes in contact with said tip and severs the same.

In the top of the casing, near the periphery thereof, is an opening K, which is located over the rim G of the wheel F, whereby said rim may be seen through said opening K. On the rim are ornamental marks L, of different colors, shapes, sizes, or other characteristics, so disposed that when the wheel ceases its rotation either of said characteristics will appear through the opening K.

The operation is as follows: The wheel E is operated, whereby power is imparted to the ring, the latter rotating with considerable velocity. The tip end of a cigar is inserted in either of the openings J, so as to be in the path of the knife H, whereby the projecting portion of the tip is quickly and sharply or neatly severed, as is evident, the tip dropping into the casing. The shaft C passes freely through the top plate of the casing and has its upper end mounted in a stirrup on said plate. The rim G is made, preferably, loaded or heavy, whereby considerable power may be imparted to the ring, so as to cause the blade to make a clean cut on the tip of the cigar. The top of the casing has a portion or segment made removable, as seen in Fig. 3, whereby access may be had to the knife, the ring, and interior of the casing. If desired, the knife or blade H may be in upright position, in which case the openings J may be formed in the side of the casing, as shown dotted in Fig. 1.

Having thus described my invention, what I claim as new, and desire to secure by Letters Patent, is—

A casing with a top plate, the latter having a tip-receiving opening therein, a vertical shaft mounted in said casing and passing freely through said top plate and having a bearing thereon, a pinion on said shaft, a standard rising from the top plate, a driving-wheel mounted on said standard and gearing with said pinion, and a horizontal wheel secured to the shaft within the casing, carrying a knife which is close to the under side of the top plate, the parts named being combined substantially as described, forming an improved cigar-cutter, as stated.

JAMES H. BOWEN.

Witnesses:
JOHN A. WIEDERSHEIM,
A. P. JENNINGS.